United States Patent

[11] 3,633,644

| [72] | Inventor | Mortimer Russell Dock<br>P.O. Box 2406, Arlington, Va. 22202 |
|---|---|---|
| [21] | Appl. No. | 3,089 |
| [22] | Filed | Jan. 15, 1970 |
| [45] | Patented | Jan. 11, 1972 |

[54] CROSSMEMBER FOR A TRACTION ASSEMBLY, HAVING REPLACEABLE CLEATS
5 Claims, 6 Drawing Figs.

[52] U.S. Cl. .................................................. 152/229
[51] Int. Cl. ................................................ B60c 27/20
[50] Field of Search .................................... 152/229, 210

[56] References Cited
UNITED STATES PATENTS

| 2,469,666 | 5/1949 | Raz-Ammann | 152/229 |
| 3,307,604 | 3/1967 | Develey | 152/229 |
| 3,408,730 | 11/1968 | Anderson | 152/210 |
| 3,481,383 | 12/1969 | Gower | 152/229 |

Primary Examiner—James B. Marbert

ABSTRACT: This invention relates to crossmembers for a traction assembly, having cleats assembled therein for removal and replacement when the same become worn.

PATENTED JAN 11 1972  3,633,644

INVENTOR.
MORTIMER RUSSELL DOCK

CROSSMEMBER FOR A TRACTION ASSEMBLY, HAVING REPLACEABLE CLEATS

This invention relates to crossmembers for traction devices of the type commonly known as skidder chains, for use over the tires of heavy motor vehicles such as trucks and tractors.

Heretofore such crossmembers have been forged or cast or welded so that each member was integrally formed with the cleats which provided the traction, and the members were then attached, by means of tag chains, to side chains which followed the path and contour of the tire.

In the present invention, it is proposed that the crossmembers be formed of individual parts of such configuration and such nature that the parts which are subjected to the greatest wear may be removed and replaced as needed.

Specifically, the invention provides for a set of said crossmembers, each lying substantially in its own plane, and having an open center area surrounded by a circular or elliptical ring, or a multiangular enclosure such as a square or a polygon. For purposes of this disclosure, said member is hereinafter sometimes referred to as a ring, and is so shown in the drawings, without intent of limitation to circularity thereof. Upon the outer periphery of said members are loops, formed integrally therewith, for attachment thereof by means of tag chains to the side chains of the traction assembly; and in the body of said member, tapered orifices are provided to accommodate wedge inserts, the heads of which project from the plane of the member to form cleats, thus providing traction at multiple points upon slippery surfaces or through difficult terrain. The walls of said orifices, and the sides of said wedges, have ridged or roughened surfaces, to enhance the gripping engagement of said surfaces. Said wedge inserts, being subjected to the greatest amount of wear, may be removed from the crossmember and replaced, such replacement providing traction equal to that of a new assembly, at only the cost of such new wedge inserts.

An advantage of this invention is the greater strength which may be achieved by the proportioning of the respective components and the prolongation of life of the members by the replacement of worn parts, i.e., the wedge inserts forming the cleats, which are the smallest components of the structure.

Another advantage is the possibility of making the crossmembers either by forging or casting, and making the wedge inserts of stronger material, such as alloy or hardened steel, thus increasing the strength and therefore the effectiveness of the traction device, without a corresponding increase in cost.

For a better understanding of the invention, reference is made to the accompanying drawings, in which.

Figure 1:
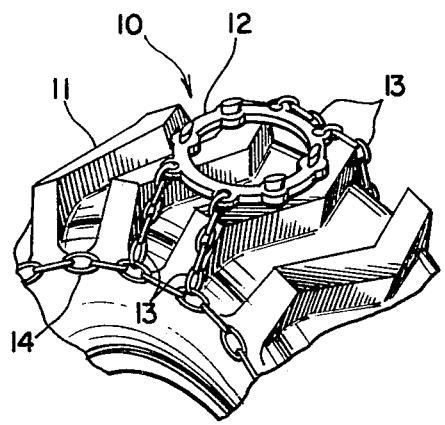
FIG. 1 shows a perspective view of a segment of a skidder chain assembly embodying the crossmembers of the present invention, mounted on the wheel of a vehicle.

With more particular reference to the drawings, it will be seen that in FIG. 1, traction assembly 10 is shown mounted over tire 11, with crossmembers 12 attached by means of tag chains 13 to side chain 14.

Figure 2:
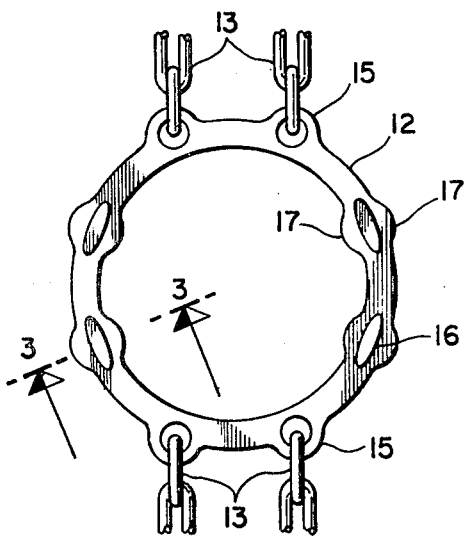
FIG. 2 shows a top plan view of one of such crossmembers.

FIG. 2 shows a crossmember 12 having loops 15 formed integrally therewith for receipt of connectors forming a part of tag chains 13; and tapered openings 16 at spaced-apart positions in said member, the latter being enlarged as at 17, 17 to reinforce said member at the points of said openings.

Figure 3:
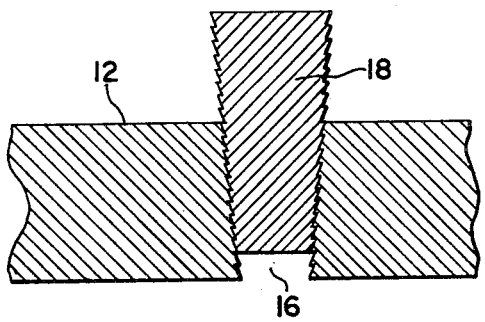
FIG. 3 is an enlarged segment of the said crossmember on line 3—3 of FIG. 2, with elongated tapered opening for the receipt of a wedge insert, transverse to the plane of said member, to form the cleat which provides traction.

In FIG. 3, a segment of said crossmember 12 is shown, enlarged, with tapered opening 16 and wedge insert 18 partially inserted therein.

Figure 4:
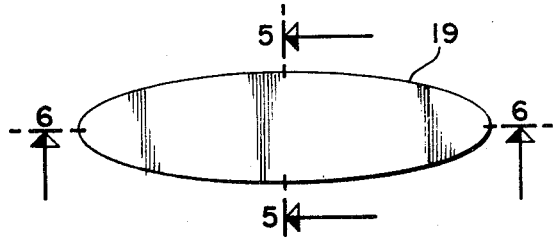
FIG. 4 shows an end view of one of the wedge inserts of the present invention.
Figure 5:
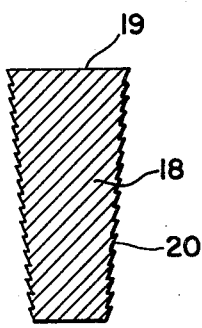
FIG. 5 is a view taken on line 5—5 of FIG. 4.
Figure 6:
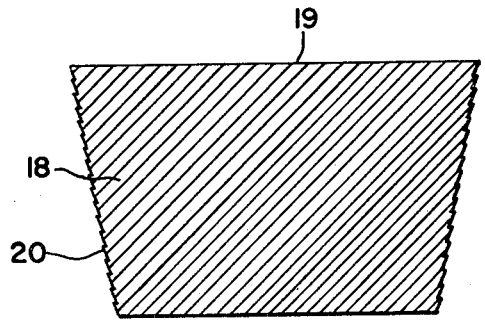
FIG. 6 is a view taken on line 6—6 of FIG. 4.

The head 19 of said wedge insert 18, appearing in FIG. 4, is shown in generally elliptical configuration, and the side views in FIGS. 5 and 6 indicate the flattened configuration of said wedge insert. Such flattening permits increased traction by the use of such bladelike cleats, or lugs, formed by head 19, without weakening the member through which said wedges are driven by necessitating a wide opening. The opposing slanted ridges on the walls of the wedge insert and the opening are shown clearly in FIGS. 3, 5 and 6, and in the latter two FIGS. said ridges are identified by the numeral 20. These opposing slanted ridges have the locking effect of opposing barracuda-tooth structures, or mating gears, thus substantially eliminating the possibility of accidental disengagement of the wedges from the openings in the crossmember.

In service, the wedge inserts are placed into the tapered openings in the crossmember and are forced into engagement.

Where the terrain is rocky or where exceptionally hard usage causes the wedge inserts to be worn down, removal of the assembly from the wheel of the vehicle permits reverse force to be exerted for removal of the worn cleats and insertion of a new set. Such replacement, however, may be minimized, as suggested above, by the use of alloy or hardened steel for the wedge inserts.

The invention having been thus disclosed, what is claimed is:

1. A crossmember a traction device, comprising a substantially flat, open-centered member having, integral therewith, means for attachment thereof to side chains, and at multiple points within the body material forming said member, tapered openings, each accommodating therein an insert, said openings and said inserts having walls formed with opposing slanted transverse ridges providing lockable engagement of said inserts within the walls of said openings; and each of said inserts having one end projecting beyond the exterior plane of said cross member when the latter is mounted on a vehicle wheel.

2. The invention of claim 1 wherein said inserts are of wedgelike configuration, the smaller end being inserted into said tapered opening in said crossmember and the larger end, or head, projecting to form a cleat to provide traction on difficult surfaces.

3. The invention of claim 1 wherein said cross member is formed with enlarged walls around said tapered openings which accommodate said inserts.

4. The invention of claim 1 wherein said inserts are secured in said tapered openings by their forcible engagement therein.

5. The invention of claim 1 wherein said crossmember is fabricated of forged or cast steel and said wedge inserts are formed of alloy or hardened steel.

* * * * *